US007515924B2

(12) United States Patent
Nanda et al.

(10) Patent No.: US 7,515,924 B2
(45) Date of Patent: *Apr. 7, 2009

(54) METHOD AND MODULE FOR OPERATING INDEPENDENTLY OF A REMOTE TERMINAL IF AN INCOMING PILOT SIGNAL IS NOT DETECTED WITHIN A TIME PERIOD AND ENABLING A PILOT SIGNAL TRANSMISSION

(75) Inventors: Sanjiv Nanda, Ramona, CA (US); Ranganathan Krishnan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 540 days.

This patent is subject to a terminal disclaimer.

(21) Appl. No.: 10/699,007

(22) Filed: Oct. 30, 2003

(65) Prior Publication Data

US 2005/0096074 A1   May 5, 2005

(51) Int. Cl.
H04B 7/00 (2006.01)
H04Q 7/20 (2006.01)
(52) U.S. Cl. .................... 455/522; 455/574; 455/435.1; 370/254
(58) Field of Classification Search ............ 455/522, 455/517, 518, 519, 524, 557, 574, 415, 416, 455/417, 418, 435.1, 434, 437, 445, 450, 455/453, 96, 13.1, 11.1, 456.1, 426.1, 515, 455/474; 370/254, 255, 449, 7.25, 7.32; 340/7.25, 7.32
See application file for complete search history.

(56) References Cited

U.S. PATENT DOCUMENTS 5,572,528 A * 11/1996 Shuen ..................... 370/402
5,940,431 A    8/1999 Haartsen et al.
5,987,011 A * 11/1999 Toh ......................... 370/331

(Continued)

FOREIGN PATENT DOCUMENTS

CN     4136242     11/1996

(Continued)

OTHER PUBLICATIONS

International Search Report - PCT/USO4/036283 - International Search Authority, European Patent Office - Feb. 28, 2005.

(Continued)

*Primary Examiner*—Matthew D Anderson
*Assistant Examiner*—Shaima Q Aminzay
(74) *Attorney, Agent, or Firm*—Albert J. Harnois, Jr.; Florin Cone; Thomas R. Rouse

(57) ABSTRACT

Systems and techniques are disclosed relating to wireless communications. The systems and techniques involve wireless communications wherein a module or communications device is configured to listen for a period of time for an incoming pilot signal from a remote terminal that exceeds a threshold power level for the purpose of acquiring such incoming pilot signal and operating under control of the remote terminal, and operating independently of the remote terminal if such pilot signal is not detected within the period of time, such independent operation including transmitting a pilot signal.

38 Claims, 4 Drawing Sheets

U.S. PATENT DOCUMENTS

| | | | |
|---|---|---|---|
| 6,026,297 A * | 2/2000 | Haartsen | 455/426.1 |
| 6,067,291 A * | 5/2000 | Kamerman et al. | 370/338 |
| 6,519,460 B1 | 2/2003 | Haartsen | 455/452 |
| 6,590,928 B1 * | 7/2003 | Haartsen | 375/134 |
| 6,711,409 B1 * | 3/2004 | Zavgren et al. | 455/445 |
| 6,876,643 B1 * | 4/2005 | Aggarwal et al. | 370/338 |
| 6,975,613 B1 * | 12/2005 | Johansson | 370/338 |
| 7,158,484 B1 * | 1/2007 | Ahmed et al. | 370/254 |
| 2003/0016732 A1 | 1/2003 | Miklos et al. | |
| 2003/0177219 A1 * | 9/2003 | Taib et al. | 709/223 |
| 2004/0003111 A1 * | 1/2004 | Maeda et al. | 709/237 |
| 2004/0192204 A1 * | 9/2004 | Periyalwar et al. | 455/25 |
| 2004/0266339 A1 * | 12/2004 | Larsson | 455/7 |
| 2005/0215196 A1 * | 9/2005 | Krishnan et al. | 455/41.2 |
| 2005/0239491 A1 * | 10/2005 | Feder et al. | 455/522 |
| 2005/0282554 A1 * | 12/2005 | Shyy et al. | 455/450 |

FOREIGN PATENT DOCUMENTS

| | | |
|---|---|---|
| JP | 2000138685 | 5/2000 |
| JP | 2001054165 | 2/2001 |
| KR | 20010048328 | 6/2001 |
| WO | WO 01/45437 A1 | 6/2001 |
| WO | WO 02/087172 A1 | 10/2002 |

OTHER PUBLICATIONS

Written Opinion - PCT/US04/036283 - International Search Authority, European Patent Office - Feb. 28, 2005.

International Preliminary Report on Patentability - PCT/US04/036283 - IPEA, US - Apr. 28, 2006.

* cited by examiner

METHOD AND MODULE FOR OPERATING INDEPENDENTLY OF A REMOTE TERMINAL IF AN INCOMING PILOT SIGNAL IS NOT DETECTED WITHIN A TIME PERIOD AND ENABLING A PILOT SIGNAL TRANSMISSION

BACKGROUND

The present disclosure relates generally to wireless communications, and more specifically, to various systems and techniques relating to the formation of ad-hoc networks.

In conventional wireless communications, an access network is generally employed to support communications for any number of mobile devices. These access networks are typically implemented with multiple fixed site base stations dispersed throughout a geographic region. The geographic region is generally subdivided into smaller regions known as cells. Each base station may be configured to serve all mobile devices in its respective cell. As a result, the access network may not be easily reconfigured to account for varying traffic demands across different cellular regions.

In contrast to the conventional access network, ad-hoc networks are dynamic. An ad-hoc network may be formed when a number of wireless communication devices, often referred to as terminals, decide to join together to form a network. Since terminals in ad-hoc networks operate as both hosts and routers, the network may be easily reconfigured to meet existing traffic demands in a more efficient fashion. Moreover, ad-hoc networks do not require the infrastructure required by conventional access networks, making ad-hoc networks an attractive choice for the future.

Ultra-Wideband (UWB) technology is an example of a communications methodology that may be implemented with ad-hoc networks. UWB technology provides high speed communications over an extremely wide bandwidth. At the same time, UWB signals are transmitted in very short pulses that consume very little power. The output power of the UWB signal is so low that it looks like noise to other RF technologies, making it less interfering.

The topology of the ad-hoc network may have a direct impact on performance. An ad-hoc network topology consisting solely of uncoordinated communications between multiple terminals may be very inefficient and result in high packet forwarding and routing overhead. Accordingly, a robust methodology for forming and maintaining a network topology that is both efficient and low on overhead is desirable.

SUMMARY

In one aspect of the present invention, a module includes a receiver configured to listen for a period of time for an incoming pilot signal from a remote terminal that exceeds a threshold power level, and a processor configured to operate under control of the remote terminal if the receiver detects such incoming pilot signal within the time period, and operate independently of the remote terminal if such incoming pilot signal is not detected by the receiver within the time period, such independent operation including enabling a pilot signal transmission.

In another aspect of the present invention, a method of communications includes listening for a period of time for an incoming pilot signal from a remote terminal that exceeds a threshold power level for the purpose of acquiring such incoming pilot signal and operating under control of the remote terminal, determining that such incoming pilot signal has not been acquired within the time period, and operating independently of the remote terminal, such independent operation including transmitting a pilot signal.

In yet another aspect of the present invention, a module includes means for listening for a period of time for an incoming pilot signal from a remote terminal that exceeds a threshold power level, means for operating under control of the remote terminal if such incoming pilot signal is detected within the time period, and means for operating independently of the remote terminal if such incoming pilot signal is not detected within the time period, such independent operation including enabling a pilot signal transmission.

In a further aspect of the present invention, computer readable media embodying a program of instructions executable by a computer program may be used to perform a method of communications, the method including listening for a period of time for an incoming pilot signal from a remote terminal that exceeds a threshold power level for the purpose of acquiring such incoming pilot and operating under control of the remote terminal, determining that such incoming pilot signal has not been acquired within the time period, and operating independently of the remote terminal, such independent operation including transmitting a pilot signal.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

In the following detailed description, various aspects of the present invention may be described in the context of a UWB wireless communications system. While these inventive aspects may be well suited for use with this application, those skilled in the art will readily appreciate that these inventive aspects are likewise applicable for use in various other communication environments. Accordingly, any reference to a UWB communications system is intended only to illustrate the inventive aspects, with the understanding that such inventive aspects have a wide range of applications.

Figure 1:
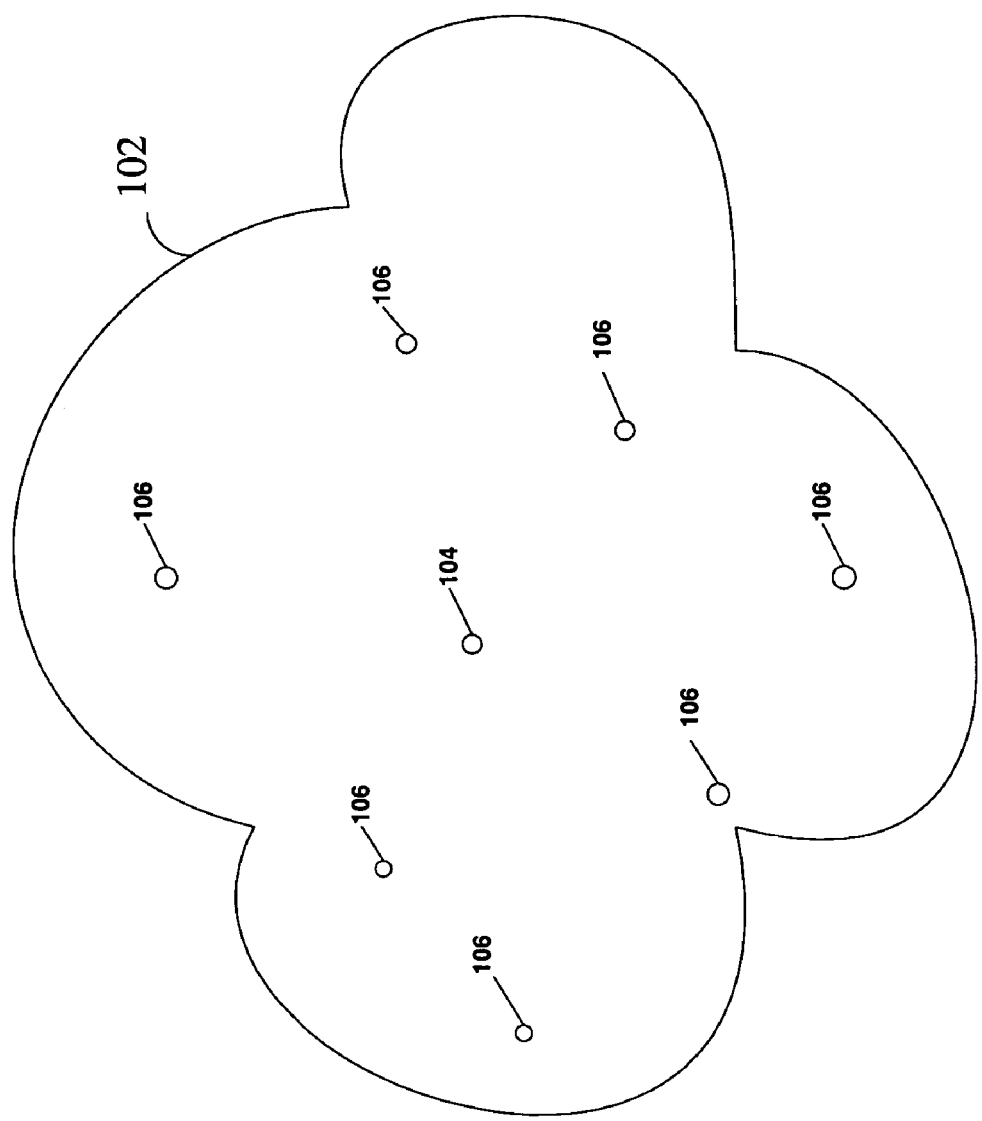
FIG. 1 is a conceptual diagram illustrating an example of a piconet.

FIG. 1 illustrates an example of a network topology for a piconet in a wireless communications system. A "piconet" is a collection of communication devices or terminals connected using wireless technology in an ad-hoc fashion. In at least one embodiment, each piconet has one master terminal and any number of member terminals slaved to the master terminal. In FIG. 1, a piconet 102 is shown with a master terminal 104 supporting communications between several member terminals 106. The master terminal 104 may be able to communicate with each of the member terminals 106 in the piconet. The member terminals 106 may also be able to directly communicate with one another under control of the master terminal 104. As to be explained in greater detail below, each member terminal 106 in the piconet 102 may also be able to directly communicate with terminals outside the piconet.

The master terminal 104 may communicate with the member terminals 106 using any multiple access scheme, such as time-division multiple access (TDMA), frequency-division multiple access (FDMA), code-division multiple access (CDMA), or any other multiple access scheme. To illustrate the various aspects of the present invention, the wireless communications system shown in FIG. 1 will be described in the context of a hybrid multiple access scheme employing both TDMA and CDMA technologies. Those skilled in the art will readily understand that the present invention is in no way limited to such multiple access schemes.

In TDMA communications, the master terminal 104 may use a periodic frame structure to communicate with the member terminals 106. This frame is often referred to in the art as a medium access control (MAC) frame because it is used to provide access to the communications medium for various channels. The frame may be any duration depending on the particular application and overall design constraints. The frame may be further divided into any number of time slots to support TDMA communications. For simplicity of discussion, a pilot signal broadcast by the master terminal 104 may be positioned in the first time slot of each frame. The exact location of the pilot signal in the frame will vary from system to system depending on the preferences of the skilled artisan.

The pilot signal may be an unmodulated spread spectrum signal, or any other reference signal that is commonly used in traditional wireless communication systems. In spread spectrum communications, a pseudo-random noise (PN) code unique to the master terminal 104 may be used to spread the pilot signal. Using a correlation process, the member terminal 106 may search through all possible PN codes to acquire the strongest pilot signal, such as the pilot signal broadcast by the master terminal 104 in FIG. 1. The pilot signal may be used by the member terminal 106 to synchronize to the master terminal 104. The pilot signal may also be used by the member terminal 106 as a phase reference in order to coherently demodulate communications from the master terminal 104. The acquisition of a spread spectrum pilot signal is well known in the art.

Once the member terminal 106 acquires the pilot signal, it may communicate with the master terminal 104 through various control and traffic channels. One or more control channels may be time-division multiplexed into any number of time slots in the frame. Since the time slot assignments for the control channels are known by the member terminals 106, a priori, the control channels may be accessed once the member terminal 106 is synchronized to the pilot signal. The control channels may be used by the master terminal 104 to schedule intra-piconet communications. The term "intra-piconet communications" refers to communications between terminals residing in the same piconet. The master terminal 104 may assign one or more time slots in the frame to support intra-piconet communications. By way of example, a particular transmitting terminal and a particular receiving member terminal may be scheduled to communicate during the $n^{th}$ time slot in the frame. The transmitting terminal may use a portion of the $n^{th}$ time slot in the frame to transmit a pilot signal, which may be used by the receiving terminal to coherently demodulate the communications. The master terminal 104 may also grant transmit opportunities in a slot to any number of terminals 106 in its piconet using a CDMA scheme.

The master terminal 104 may also be used to manage high data rate communications. This may be achieved by allowing only those terminals that can support a minimum or threshold data rate with the master terminal 104 to join the piconet 102. In UWB communication systems, for example, a data rate of 1.2288 Mbps may be supported at a distance of 30-100 meters depending on the propagation conditions. In these systems, the master terminal 104 may be configured to organize the piconet 102 with member terminals 106 that can support a data rate of at least 1.2288 Mbps. If higher data rates are desired, the range may be further restricted. By way of example, data rates of 100 Mbps may be achieved in UWB systems at a range of 10 meters.

The member terminal 106 may be configured to determine whether it can satisfy the minimum data rate requirements of the piconet by measuring the link quality using the pilot signal broadcast from the master terminal 104. As discussed in greater detail above, a terminal may identify the strongest pilot signal through a correlation process. The link quality may then be measured by computing the carrier-to-interference (C/I) ratio from the strongest pilot signal by means well known in the art. Based on the C/I ratio computation, the member terminal 106 may then determine whether the minimum or threshold data rate may be supported by means also well known in the art. If the member terminal 106 determines that the minimum or threshold data rate may be supported, it may attempt to join the piconet 102 by registering with the master terminal 104 over the appropriate control channel.

A member terminal 106, due to the availability of line power or other power source, or larger stored power (battery), or due to administrative status may be a preferred master terminal based on these enhanced capabilities. After a member terminal 106 with enhanced capabilities registers with the piconet master 104, it may attempt to gain control of the piconet through an exchange of signaling messages. If the piconet master 104 is not itself a preferred piconet master, it may surrender control to the member terminal 106. In the process of surrendering control, the piconet master 104 may transfer its current state (e.g. on-going reservations, bridge terminals, etc) to the member terminal 106. After the state transfer is complete, the piconet master may stop transmitting its pilot signal, and the member terminal 106 may become the new piconet master by transmitting its pilot signal. Terminals registered with the former piconet master 104 may re-acquire and re-register with the new piconet master 106. In at least one embodiment, communications from the other member terminals 106 may be redirected to the new piconet master 106 before it gains control of the piconet.

Figure 2:
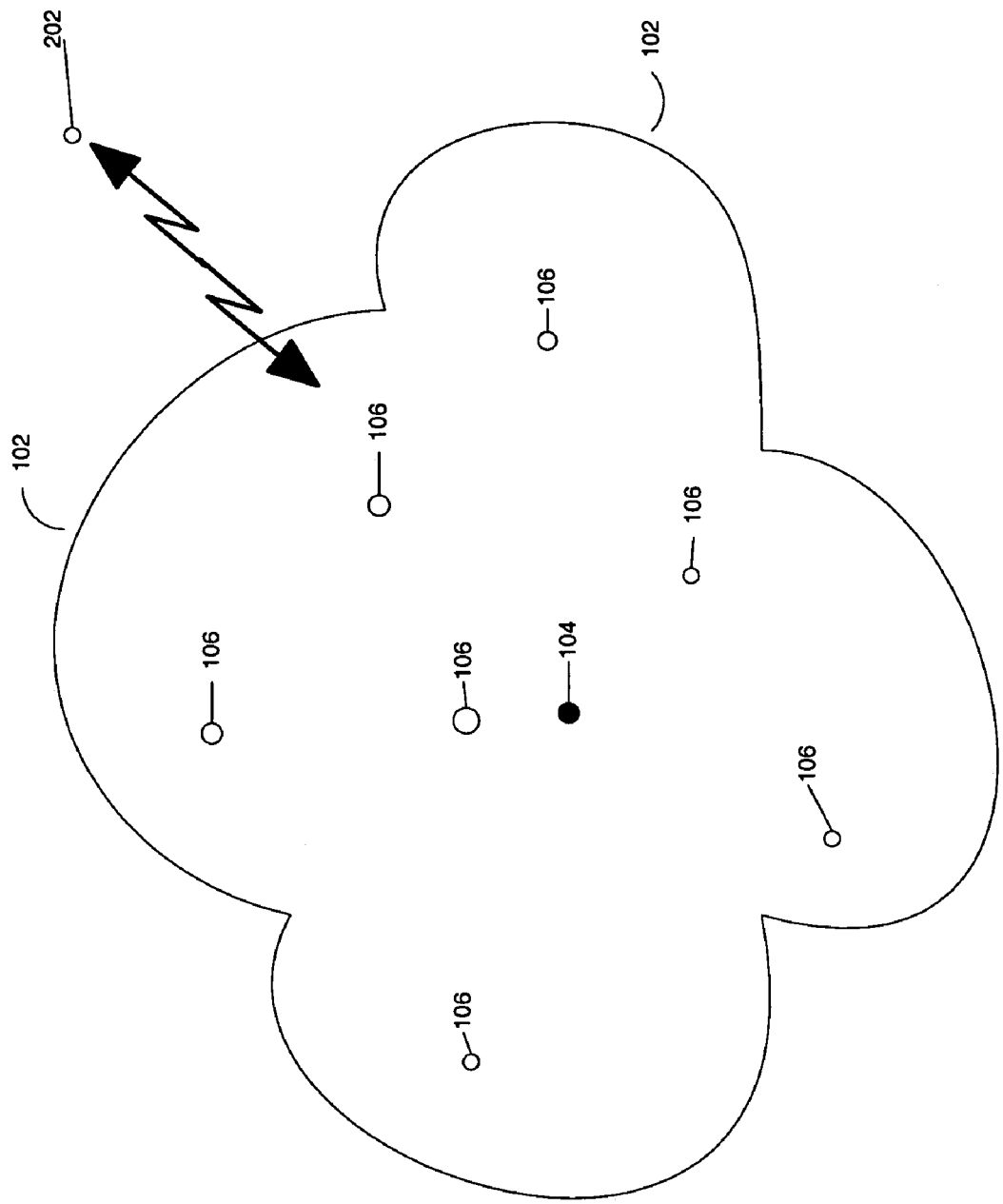
FIG. 2 is a conceptual diagram illustrating an example of a piconet having a peer-to-peer connection with an isolated terminal.

In some instances, a terminal may be unable to find a pilot signal of sufficient signal strength to support the minimum or threshold data rate after a predetermined amount of time. This may result from any number of reasons. By way of example, the terminal may be too far from the master terminal. Alternatively, the propagation environment may be insufficient to support the requisite data rate. In either case, the terminal may be unable to join an existing piconet. FIG. 2 illustrates an example of a network topology with a wireless terminal 202 unable to join the piconet 102 of FIG. 1.

Referring to FIG. 2, if the terminal 202 is far away from the master terminal 104, the terminal 202 may determine from the C/I ratio computed from the pilot signal broadcasted by the master terminal 104 that the minimum or threshold data rate cannot be sustained, or the terminal 202 may be unable to decode the pilot signal from master terminal 104. As a result, the terminal 202 may begin operating as an isolated terminal independent of the piconet 102 by transmitting its own pilot signal. In a manner to be described in greater detail shortly, the isolated terminal 202 may engage in peer-to-peer communications with any member terminal 106 in the piconet 102 through a bridge terminal. "Peer-to-peer communications" refers to those communications between terminals that are not controlled by a master terminal. As discussed below, the master terminal may in fact set aside time in the piconet schedule to accommodate peer-to-peer transmissions from the bridge terminal.

The master terminal 104 may designate any number of member terminals 106 as piconet edge terminals, such as member terminal 106a. The designation of piconet edge terminals may be based on feedback from the various member terminals 106. By way of example, the computed C/I ratio from each member terminal 106 may provide a rough indication of those member terminals located at the edge of the piconet 102. The piconet edge terminal 106a may be assigned the task of listening for pilot signals from isolated terminals. When a piconet edge terminal 106a detects a pilot signal from an isolated terminal, such as the isolated terminal 202 shown in FIG. 2, then the piconet edge terminal 106a may establish a-peer-to-peer connection with the isolated terminal 202. Although peer-to-peer communications in their purest sense are random, the master terminal 104 may exercise some control over these communications by scheduling the transmission and receiving times of the piconet edge terminal 106a. To reduce interference, the master terminal 104 may schedule intra-piconet communications and peer-to-peer communications by the piconet edge terminals at different times. Communications between the isolated terminal 202 and any member terminal 106 in the piconet 102 may be supported through the bridge terminal 106a.

Figure 3:
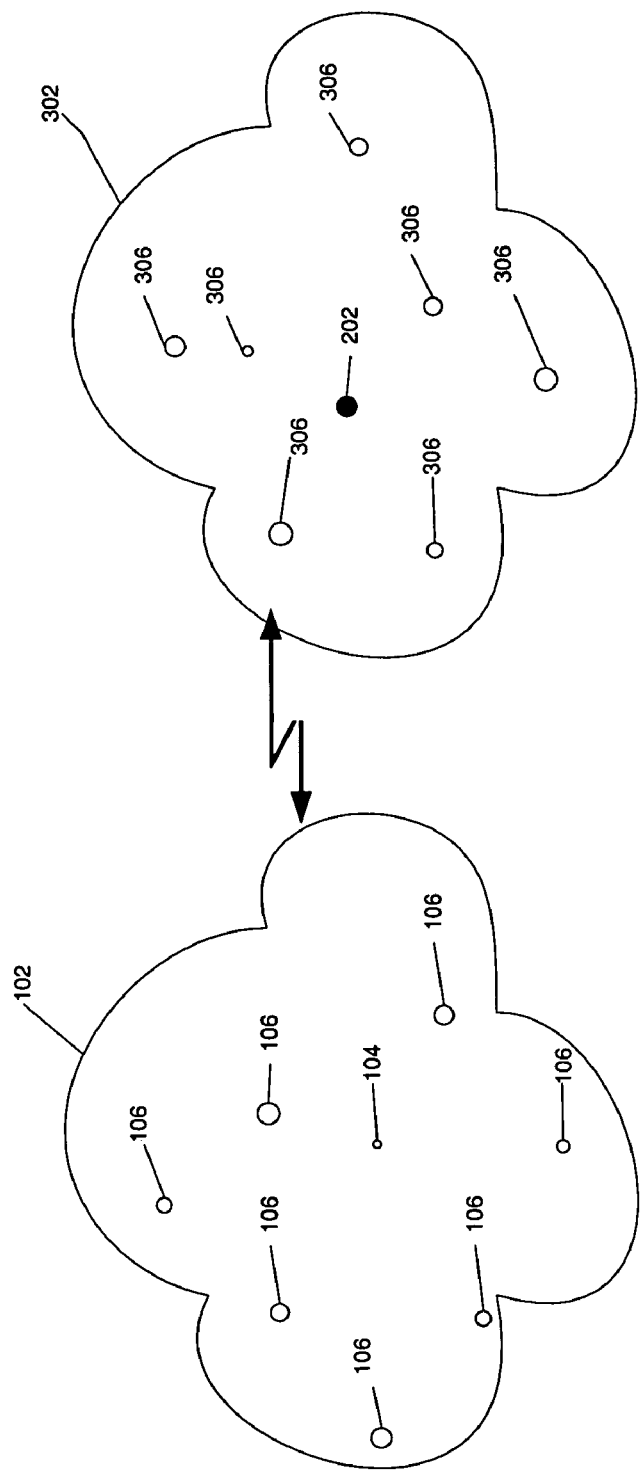
FIG. 3 is a conceptual diagram illustrating an example of two neighboring piconets.

The isolated terminal 202 may become the master terminal for a new piconet On power up, terminals that are able to receive the pilot signal broadcast from the isolated terminal 202 with sufficient strength may attempt to acquire that pilot signal and join the piconet of this isolated terminal. FIG. 3 illustrates an example of a network topology of this kind. The first piconet 102 is the same piconet described in connection with FIG. 1 with its master terminal 104 supporting several member terminals 106. The isolated terminal 202 described in connection with FIG. 2 has become the master terminal for a second piconet 302. The master terminal 202 in the second piconet 302 may be used to support multiple member terminals 306.

Using feedback from the various member terminals 306, the master terminal 202 in the second piconet 302 may designate one or more member terminals 306 as piconet edge terminals, such as member terminal 306a. As described in greater detail above, the master terminal 104 in the first piconet 102 may also designate one or more member terminals 106 as piconet edge terminals, such as member terminal 106a. In addition to listening for pilot signals broadcast from isolated terminals, each piconet edge terminal may also listen for pilot signals broadcast from other neighboring piconet master terminals. By way of example, when the piconet edge terminal 106a from the first piconet 102 detects the pilot signal broadcast from the master terminal 202 in the second piconet 302, it may establish a connection with that master terminal 202. The master terminal 202 may maintain that connection, or alternatively, assign a piconet edge terminal 306a to maintain the connection, in the second piconet 302. The piconet edge terminals 106a and 306a may be referred to as bridge terminals. Communications between a terminal in the first piconet 102 and a terminal in the second piconet 302 may be supported through the bridge terminals 106a and 306a.

The time period for which a terminal searches for a pilot signal from an existing piconet master before starting to transmit its own pilot signal may vary depending on the specific communications application and the overall design constraints. In one embodiment, the search time may be a function of the terminals enhanced capabilities. Terminals with enhanced capabilities may use a shorter search time before starting to transmit a pilot signal.

Returning to FIG. 1, the master terminal 104 may be used to manage the number of member terminals 106 that may join the piconet 102. In this embodiment, the master terminal 104 maintains a table of registered member terminals 106 in memory. The number of registered terminals stored in memory may be compared to a threshold number. The threshold number may be predetermined at the factory, or alternatively dynamically adjusted depending on the communications environment and other related factors. In any event, once the number of registered member terminals 106 reaches the threshold, the master terminal 104 may reduce the power level of the pilot signal. When the power level of the pilot signal is reduced, certain member terminals farthest from the master terminal 104 may no longer be able to receive the pilot signal at a level that is able to sustain the minimum or threshold data rate. These terminals may drop their membership in the piconet 102 and search for an alternative piconet master terminal. If one or more of these terminals is unable to find a suitable piconet master terminal, it may begin operating as an isolated terminal by transmitting its own pilot signal. It may remain an isolated terminal for peer-to-peer communications until such time that one or more wireless devices register with it, thereby forming a new piconet.

Figure 4:
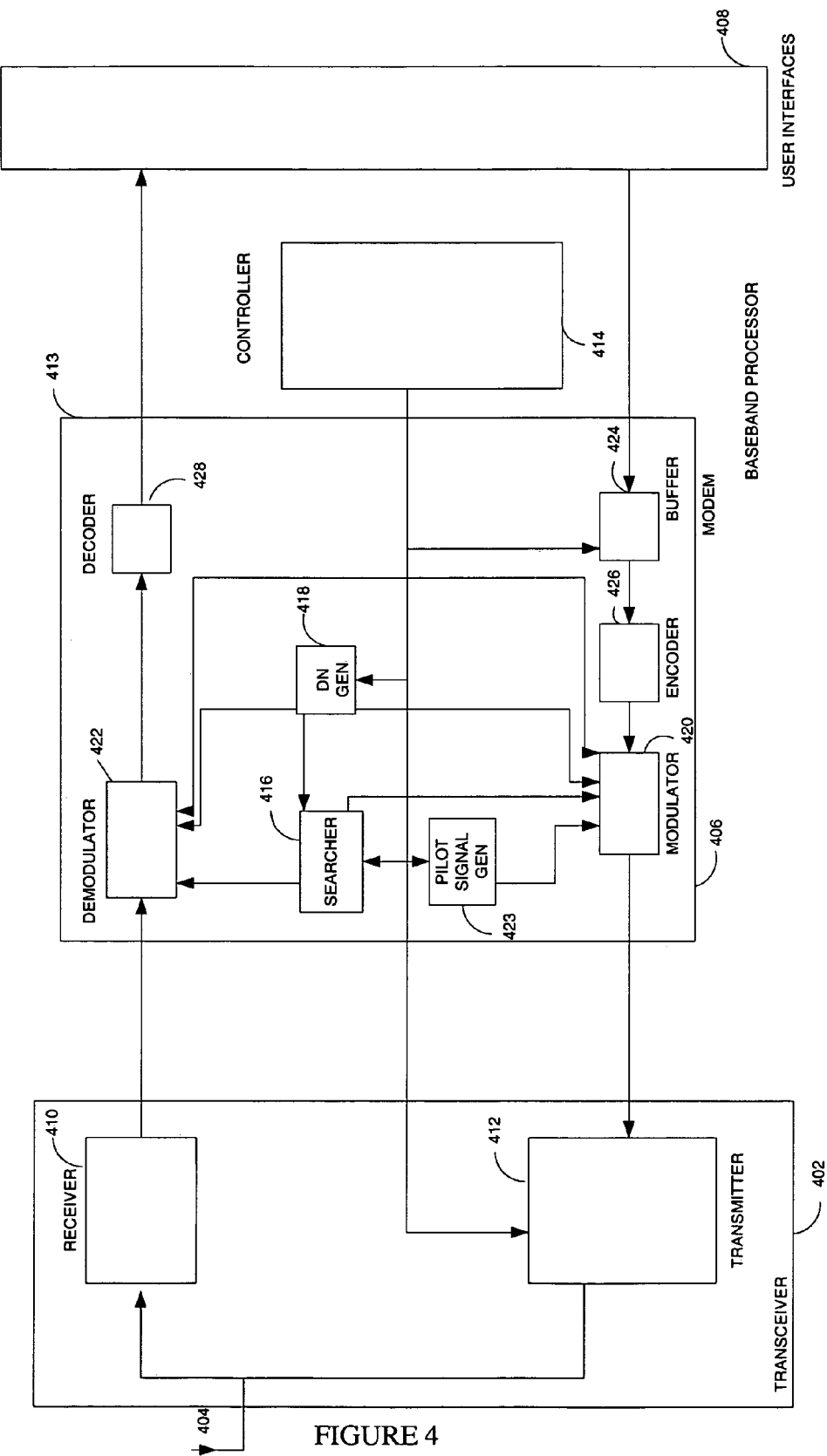
FIG. 4 is a functional block diagram illustrating an example of a terminal capable of operating within a piconet.

FIG. 4 is a conceptual block diagram illustrating one possible configuration of a terminal. As those skilled in the art will appreciate, the precise configuration of the terminal may vary depending on the specific application and the overall design constraints. For the purposes of clarity and completeness, the various inventive concepts will be described in the context of a UWB terminal with spread-spectrum capability, however, such inventive concepts are likewise suitable for use in various other communication devices. Accordingly any reference to a spread-spectrum UWB terminal is intended only to illustrate the various aspects of the invention, with the understanding that such aspects have a wide range of applications.

The terminal may be implemented with a front end transceiver 402 coupled to an antenna 404. A baseband processor 406 may be used to provide signal processing as well as executive control and overall system management functions. The terminal may also include various user interfaces 408 such as a keypad, display, ringer, vibrator, audio speaker, microphone, and the like.

The transceiver 402 may include a receiver 410. The receiver 410 may be used to convert an analog waveform at RF frequencies received from the antenna 404 to a digital baseband signal. The receiver 410 may also be used to provide various gain and filter functions to improve overall performance.

The transceiver 402 may also include a transmitter 412. The transmitter 412 may be used to convert a digital baseband signal from the baseband processor 406 to an analog waveform at RF frequencies for over the air transmission through the antenna 404. The transmitter 412 may also be used to shape the waveform and provide gain adjustment to support various power control functions that are well known in the art.

The baseband processor 406 may include a modem 413 which provides various signal processing functions such as pilot signal acquisition, time synchronization, frequency tracking, spread-spectrum processing, modulation and demodulation functions, and forward error correction. The signal processing functions performed by the modem 413 may be controlled and coordinated by a controller 414.

When power is initially applied to the terminal, the controller 414 may be used to invoke various signal processing functions including a search by the modem 413 through the digital baseband signal output from the receiver 410 for a spread-spectrum pilot signal broadcast from a master terminal. This may be accomplished through the combined efforts of a searcher 416 and PN code generator 418. The PN code generator 418 may be used to sequence through all possible PN codes as the searcher attempts to align each code generated by the PN code generator 418 with a spread-spectrum pilot signal in the digital baseband signal. If the searcher 416 is successful and locates a pilot signal within a predetermined time established by the controller 412, then the baseband processor 406 may be configured to slave its operation to the master terminal. As discussed earlier, the predetermined time may be set as a function of the terminal's capabilities. If the searcher 416 detects multiple pilot signals, it may select the strongest pilot signal to acquire and slave its operation to.

As discussed in detail earlier, the acquisition of the pilot signal may depend on the minimum data rate requirements for the piconet. The searcher 416 may be used to ensure that this condition is met by computing and evaluating a parameter from the pilot signal indicative of link quality. By way of example, the searcher 416 may be configured to compute the C/I ratio from the pilot signal and compare the resultant computation to a threshold. Using this method, the strongest pilot signal that exceeds the threshold may be acquired.

Once the pilot signal for a master terminal is acquired, the code generated by the PN code generator 418 and used by the searcher 416 to correlate the pilot signal may be provided to a modulator 420. This code is a locally generated replica of the unique PN code assigned to the master terminal. The modulator 420 may use the code to spread various communications to the master terminal including registration information generated by the controller 414, C/I ratio computed by the searcher 416, and any other signaling information such as might be the case if the terminal is attempting to gain control of the piconet because it is a preferred master terminal. This information may be channelized by using a time-division multiplexing scheme or TDMA scheme using conventional contention and reservation techniques, or alternatively, orthogonal codes, such as Walsh codes. In any event, this spread-spectrum information may be released to the transmitter 412 in the appropriate control channel time slots in the frame.

The same code provided to the modulator 420 may also be provided to a demodulator 422 to recover information on one or more control channels. The recovered information may contain various commands and acknowledgements for the controller 414. By way of example, the recovered information may contain an acknowledgement indicating that the terminal has been successfully registered with the master terminal, or that the master terminal will relinquish control of the piconet to the baseband processor 406.

Another example of information that may be recovered by the demodulator 422 from the control channels is a command instructing the terminal to listen for pilot signals outside the piconet, as the case might be if the terminal is at the edge of the piconet. In response, the controller 414 may enable the searcher 416 to perform this function. The results of the search may be reported back to the master terminal using the modulator 420 to spread the results with the locally generated replica of the PN code for the master terminal.

Scheduling information may also be recovered by the demodulator 422 from the control channels and provided to the controller 414. The scheduling information may include transmission and reception times for the terminal. If the communications are spread-spectrum, the scheduling information may also include PN code assignments for each transmission and reception The controller 414 may use this scheduling information to manage the baseband processor 406.

Returning for a moment to the pilot signal acquisition process on power-up, the controller 414 may be configured to disable the searcher 416 if a pilot signal of suitable strength cannot be acquired within a predetermined time. Once the searcher 416 is disabled, the controller 414 may configure the baseband processor 404 as an isolated or master terminal. In this configuration, the controller 414 may be used to enable a pilot signal generator 423. The pilot generator 423 may be used to provide a pilot signal to the modulator 420. The modulator 420 may spread the pilot signal with a PN code unique to the terminal. The spread-spectrum pilot signal may then be provided to the transmitter 412 for over-the-air broadcast via the antenna 404.

The controller 414 may control the power level of the pilot signal to manage the size of the piconet. This may be achieved in a variety of fashions. By way of example, the controller 414 may be configured to maintain a list of all registered terminals in memory. As the registrations change due to the mobility of the member terminals, the controller 414 may be configured to periodically compare the number of registered terminals to a threshold. The threshold may be set to limit the amount of traffic in the piconet to avoid adverse effects on time sensitive communications. If the number of terminal registrations exceed the threshold, then the controller 414 may reduce the power of the pilot signal at the transmitter 412. This should cause terminals at the edge of the piconet to drop their membership because they can no longer meet the minimum data rate requirements for the piconet.

The controller 414 may also be used to perform various control functions. By way of example, the controller 414 may engage in two-way communications with its member terminals to complete the registration process using one or more control channels. Piconet edge terminal assignments based on the C/I ratio computations of the individual member terminals and scheduling assignments may also be made by the controller. The information on the control channels may be spread with the terminal PN code by the modulator 420 for transmissions, and recovered using the terminal PN code by the demodulator 422 upon receipt.

Whether the baseband processor 406 is configured as a master or member terminal of a piconet, the manner in which traffic communications are handled are fundamentally the same. A buffer 424 may be used to store data from one or more of the various user interfaces 408, such as data from the keypad or voice from the microphone. The controller 414 may be used to release the data from the buffer 424 at the scheduled time. The data may be provided to an encoder 426 for convolutional coding and interleaving. The encoded data may be provided to the modulator 420 for modulation and spreading with the appropriate PN code assigned to that transmission. The resultant data may then be provided to the transmitter 412 for over-the-air transmission via the antenna 404.

The demodulator 422 may use a rake receiver to recover data transmitted by another terminal. Rake receivers are well known in the art. The rake receiver uses independent fading of resolvable multi-paths to achieve diversity gain. Specifically, the rake receiver may be configured to process one or more multipaths from the transmitting terminal. Each multipath may be fed into a separate finger processor to perform PN code dispreading. The searcher 416 may use the pilot embedded in the traffic signal to identify strong multipath arrivals and assign the fingers in the rake receiver. The result from each finger processor may then be combined to recover the data. The recovered data may be demodulated and provided to a decoder 428 for de-interleaving, decoding and frame-check functions. The decoded data may then be provided to one or more of the various user interfaces 420, such as the display or audio speaker.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the subscriber station, or elsewhere. In the alternative, the processor and the storage medium may reside as discrete components in the subscriber station, or elsewhere in an access network.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A module, comprising:
   a receiver configured to listen for a period of time for a first incoming pilot signal from a first remote terminal that exceeds a threshold power level; and
   a processor configured to operate under control of the first remote terminal when the receiver detects such first incoming pilot signal within the time period, and operate independently of the first remote terminal in the case of the first incoming pilot signal exceeding said threshold level not detected by the receiver within the time period, such independent operation including enabling a pilot signal transmission, whereby the transmission of a pilot signal enables communications with at least one other terminal.

2. The module of claim 1 wherein the processor is further configured to establish a communications link with a second remote terminal that acquires the transmitted pilot signal.

3. The module of claim 1 wherein the processor is further configured to register each of a plurality of second remote terminals that acquire the transmitted pilot signal.

4. The module of claim 3 wherein the processor is further configured to manage the number of terminal registrations.

5. The module of claim 4 wherein the processor is further configured to manage the number of terminal registrations by adjusting the power level of the pilot signal transmission.

6. The module of claim 3 wherein the processor is further configured to receive feedback from each of the registered terminals and designate one or more of the registered terminals to support communications with unregistered terminals based on the feedback.

7. The module of claim 6 wherein the feedback provided by each of the registered terminals is an indicator of the transmitted pilot signal strength measured at its respective registered terminals.

8. The module of claim 1 wherein the processor is further configured to receive a request to communicate from an unregistered terminal and assign one of the registered terminals to communicate with the unregistered terminal.

9. The module of claim 1 wherein the processor is further configured to set the threshold power level as a function of a minimum data rate that can be supported with the first remote terminal.

10. The module of claim 1 wherein the processor is further configured to register with the first remote terminal if the receiver detects such first incoming pilot signal within the time period.

11. The module of claim 10 wherein the receiver is further configured to listen for a second incoming pilot signal from a second remote terminal not registered with the remote terminal, and wherein the processor is further configured to establish a communications link with the second remote terminal if the receiver detects the second incoming pilot signal.

12. The module of claim 11 wherein the processor is further configured to schedule the receiver to listen for the second incoming pilot signal under control of the remote terminal.

13. The module of claim 10 wherein the processor is further configured to establish a communications link with a second remote terminal not registered with the remote terminal under direction of the remote terminal.

14. The module of claim 1 wherein the period of time the receiver listens for such incoming pilot signal is a function of the capabilities of the module.

15. The module of claim 1 wherein the transmission of a pilot signal enables communications with terminals not controlled by a master terminal.

16. A method of communications, comprising:
listening for a period of time for an incoming pilot signal from a first remote terminal that exceeds a threshold power level for the purpose of acquiring such incoming pilot signal and operating under control of the first remote terminal;
determining a condition of non-acquisition of such incoming pilot signal within the time period; and
operating independently of the first remote terminal after determining the condition of non-acquisition of such incoming pilot signal within the time period, such independent operation including transmitting a pilot signal, whereby the transmission of a pilot signal enables communications with at least one other terminal.

17. The method of claim 16 further comprising establishing a communications link with a second remote terminal.

18. The method of claim 16 further comprising registering each of a plurality of second terminals.

19. The method of claim 18 further comprising managing the number of terminal registrations.

20. The method of claim 19 wherein the management of the number of terminal registrations comprises adjusting the power level of the transmitted pilot signal.

21. The method of claim 18 further comprising receiving feedback from each of the registered terminals and designating one or more of the registered terminals as edge terminals to support communications with unregistered terminals based on the feedback.

22. The method of claim 21 wherein the feedback provided by each of the registered second terminals is an indicator of the pilot signal strength measured at its respective registered terminal.

23. The method of claim 16 further comprising receiving a request to communicate from an unregistered terminal and assigning one of the registered terminals to communicate with the unregistered terminal.

24. The method of claim 16 wherein the transmission of a pilot signal enables communications with terminals not controlled by a master terminal.

25. A module, comprising:
means for listening for a period of time for an incoming pilot signal from a first remote terminal that exceeds a threshold power level;
means for operating under control of the first remote terminal in the case of detection of such incoming pilot signal within the time period; and
means for operating independently of the first remote terminal whereby in the case of non-detection of such incoming pilot signal within the time period, such independent operation including enabling a pilot signal transmission to enable communications with at least one other terminal.

26. The module of claim 25 further comprising means for registering a plurality of second remote terminals that acquire the transmitted pilot signal.

27. The module of claim 26 further comprising means for managing the number of terminal registrations by adjusting the power level of the pilot signal transmission.

28. The module of claim 25 further comprising means for setting the threshold power level as a function of a minimum data rate that can be supported with the remote terminal.

29. The module of claim 25 wherein the transmission of a pilot signal enables communications with terminals not controlled by a master terminal.

30. Computer readable medium embodying a program of instructions executable by a computer program to perform communications, the instructions comprising:
listening for a period of time for an incoming pilot signal from a first remote terminal that exceeds a threshold power level for the purpose of acquiring such incoming pilot and operating under control of the first remote terminal;
determining a condition of non-acquisition of such incoming pilot signal within the time period; and
operating independently of the first remote terminal after determining the condition of non-acquisition of such incoming pilot signal within the time period, such independent operation including transmitting a pilot signal, whereby the transmission of a pilot signal enables communications with at least one other terminal.

31. The computer readable medium of claim 30 wherein the instructions further comprises registering with a plurality of second remote terminals that acquire the transmitted pilot signal.

32. The computer readable medium of claim 31 wherein the instructions further comprises managing the number of terminal registrations by adjusting the power level of the pilot signal transmission.

33. The computer readable medium of claim 30 wherein the instructions further comprises setting the threshold power level as a function of a minimum data rate that can be supported with the first remote terminal.

34. The computer readable medium of claim 30 wherein the transmission of a pilot signal enables communications with terminals not controlled by a master terminal.

35. A method of communications, comprising:
listening for a period of time to acquire an incoming pilot signal from a first remote terminal;
determining that such incoming pilot signal has been acquired within the time period;
exchanging signaling messages with the first remote terminal once such incoming pilot signal has been acquired;
enabling a pilot signal transmission for the purpose of operating independently of the first remote terminal; and
registering a plurality of second remote terminals that acquire the transmitted pilot signal, the second remote terminals previously registered with the first remote terminal prior to the exchange of signaling messages, whereby the transmission of a pilot signal enables communications with at least one other terminal.

36. The method of claim 35 wherein the transmission of a pilot signal enables communications with terminals not controlled by a master terminal.

37. A module, comprising:
a receiver configured to listen for a period of time to acquire an incoming pilot signal from a first remote terminal; and a processor configured to acquire such incoming pilot signal if when the receiver detects such incoming pilot signal within the time period, exchange signaling messages with the first remote terminal upon acquisition of such incoming pilot signal, enable a pilot signal transmission for the purpose of operating independently of the first remote terminal, and register a plurality of second remote terminals that acquire the transmitted pilot signal, the second remote terminals being previously registered with the first remote terminal prior to the exchange of signaling messages, whereby the transmission of a pilot signal enables communications with at least one other terminal.

38. The module of claim 37 wherein the transmission of a pilot signal enables communications with terminals not controlled by a master terminal.

* * * * *